(12) United States Patent
Lee

(10) Patent No.: US 10,094,096 B2
(45) Date of Patent: Oct. 9, 2018

(54) WATER STORAGE TANK STRUCTURE AND OPERATING METHOD FOR THE REVERSE OSMOSIS WATER PURIFYING SYSTEM

(71) Applicant: MAXTEC PLASTICS, INC., Taichung (TW)

(72) Inventor: Shih Ping Lee, Taichung (TW)

(73) Assignee: Maxtec Plastics, Inc., Taichung (TW)

( * ) Notice: Subject to any disclaimer, the term of this patent is extended or adjusted under 35 U.S.C. 154(b) by 339 days.

(21) Appl. No.: 15/013,134

(22) Filed: Feb. 2, 2016

(65) Prior Publication Data

US 2017/0073942 A1    Mar. 16, 2017

(30) Foreign Application Priority Data

Sep. 10, 2015 (TW) .............................. 104130009 A

(51) Int. Cl.

| *B01D 61/08* | (2006.01) |
|---|---|
| *B01D 61/02* | (2006.01) |
| *E03B 11/02* | (2006.01) |
| *E03B 1/04* | (2006.01) |
| *E03B 3/00* | (2006.01) |
| *C02F 1/44* | (2006.01) |
| *C02F 1/00* | (2006.01) |
| *B01D 61/12* | (2006.01) |

(52) U.S. Cl.
CPC .............. *E03B 11/02* (2013.01); *B01D 61/08* (2013.01); *B01D 61/12* (2013.01); *C02F 1/001* (2013.01); *C02F 1/441* (2013.01); *E03B 1/042* (2013.01); *E03B 3/00* (2013.01); *B01D 2311/04* (2013.01); *B01D 2311/2649* (2013.01); *B01D 2313/18* (2013.01); *B01D 2313/20* (2013.01); *B01D 2313/24* (2013.01); *B01D 2313/50* (2013.01); *E03B 2001/045* (2013.01)

(58) Field of Classification Search
CPC ........ B01D 2311/04; B01D 2311/2649; B01D 2313/18; B01D 2313/20; B01D 2313/24; B01D 2313/50; B01D 61/08; B01D 61/12; C02F 1/001; C02F 1/441; E03B 11/02; E03B 1/042; E03B 2001/045; E03B 3/00

See application file for complete search history.

(56) References Cited

U.S. PATENT DOCUMENTS

| 4,086,166 A * | 4/1978 | Martin | ................... B01D 37/04 |
| | | | 210/257.2 |
| 4,695,375 A * | 9/1987 | Tyler | ...................... B01D 61/08 |
| | | | 210/110 |

(Continued)

*Primary Examiner* — Terry K Cecil
(74) *Attorney, Agent, or Firm* — Rosenberg, Klein & Lee

(57) ABSTRACT

A water storage tank built for a reverse osmosis water purifying system deploys multi water flow passages of purified water and drainage water, allocated a soft bladder unit receiving purified water encompassed by the waste water in the tank. When the water tank unit is fully filled with water, the water pressure activates the auto-shut-off valve or solenoid valve to stop operation of the reverse osmosis water purifying system. When the dispensing faucet is turned on, the drainage water swells to squeeze the soft bladder unit to deliver the purified water out from the soft bladder unit to the dispensing faucet, and the drainage water flushes the reverse osmosis membrane as well. The technique enables the tank to take the least water pressure resistance to hold water and drain water which results in energy saving and water saving.

7 Claims, 15 Drawing Sheets

(56) References Cited

U.S. PATENT DOCUMENTS 4,776,952 A * 10/1988 Burrows ................ B01D 61/12
                                                                                                210/110
8,343,338 B2 * 1/2013 Schmitt ................. B01D 61/08
                                                                                                137/594

* cited by examiner

C (a) installing used water and purified water paths ;

⬇

(b) installing a soft bladder unit;

⬇

(c) installing a control valve.

FIG.13

WATER STORAGE TANK STRUCTURE AND OPERATING METHOD FOR THE REVERSE OSMOSIS WATER PURIFYING SYSTEM

BACKGROUND OF THE INVENTION

1. Field of the Invention

The present invention relates to a water storage tank with multiple water flow passages for a reverse osmosis water purifier, and more particularly, a tank regulated by a mechanical lever positioner for water flow control to hold the purified water in a soft bladder inside the tank and withdraw purified water by waste water pressure. The waste water stored in the tank stops to expand and flows down to the drain and when the purified water bladder is full. A mechanical lever positioner sensors the equal water pressure from the RO Purifier thereby stops water production. Upon dispensing the purified water from the faucet, the tank pressure drops and the lever positioner valve activates the waste water to flow in the tank hence squeezes the purified water out. While the waste water drains out and a larger volume of waste water is to flush the surface of RO membrane. An auto-shut-off valve or solenoid valve generates the reverse osmosis membrane element to produce purified water to the tank. The waste water flushes the membrane and flow down to the drain. The method and operation circulate the purified water and the waste water for the reverse osmosis water system.

2. Description of Related Art

The conventional reverse osmosis water purifying system 9 is disclosed in FIG. 14, wherein a pre-set pressure of the feed water flows toward the RO membrane filter 91 to separate purified water and drainage water. The ratio of the purified water and drainage water is approximate 1:4 which means 1 liter purified water verses 4 liters drainage water. It is a lot of waste. The purified water is stored in an air pressurized tank 95 with a bladder 951 inside keeping water pressurized in the tank when it is full and squeezed out water when water pressure released.

To conserve water, the Reverse Osmosis Water System has an automatic shut-off valve. When the storage tank 95 is full, the valve 92 stops any further water from entering the membrane 91 thereby stopping water production. By shutting off the flow this valve also stops water from flowing to the drain. Once water is drawn from the RO drinking water faucet 97, the pressure in the tank 95 drops and auto-shut-off valve 92 opens, allowing water to flow down to the membrane 91 and waste-water to flow down the drain 96.

It is noted that the conventional reverse osmosis water purifying system 9 generates a large amount of waste water and can be improved. Plus the tank 95 is limited to appliance of either certain high feed water pressure area or adding a booster pump. Due to the purified water pressure exceeds the back pressure from the system, low pressure RO membranes or optional membranes are excluded in the appliance.

The present invention intends to provide a reverse osmosis water purifying system to improve the disadvantages mentioned above. First of all, the present invention is viable to the purifying systems with low, medium or high pressure reverse osmosis membranes. The drainage water provides a force to pump out the purified water and clean the RO membrane surface resulting in energy saving and water saving. Secondly, the present invention contributes to bring a compact design with large water storage capacity. The present invention aims to provide an eco-friendly, safe and reliable water storage technique.

SUMMARY OF THE INVENTION

The present invention relates to a water tank unit comprising a chamber defined therein. Multiple passages are defined through the top of the tank. The tank has an open bottom to which a bottom cover is connected. A mechanical lever positioner for water flow control valve is built on upper tank and has multiple water flow gates which communicate with the passages respectively on top surface of the tank.

A soft bladder unit 31 is located inside the chamber 3 of the tank with an axial support shaft 32 within. The axial support shaft 32 has a passage connected to the top thereof. The connection passage is linked to one of the water gates. A lever positioner for water flow control valve 21 activates drainage water flowing freely in and out of the tank. The drainage water inside the tank drives and squeezes the purified water to be drawn out of the tank.

Preferably, the lever positioner for water flow control valve 21 comprises a stepped hole 213, a first access 214 and a second access 215. A valve plunger core 23 switches to close and open gate so as to fill and draw the purified water to and from the tank.

Preferably, a pressure relief safety device 4b is built on a pipe connecting the drainage water outlet and purified water in/out path.

Preferably, the lever positioner for water flow control valve 21 comprises a body 210, a spring member 22, a plunger core 23 and a diaphragm unit 24. The spring membrane 22, the plunger 23 and the diaphragm 24 are installed from left to right in sequence inside the valve.

Preferably, the lever positioner for water flow control valve has a body 210 and two side covers 211-212. The diaphragm unit 24 includes a film 241 and a stopper seat 242 to which the film is attached. The two side covers 211-212 respectively bonnet each end of the body. The drainage water inlet gate in the first access 214 and the purified water inlet/outlet gate in the second access 213 respectively protrude on the two side covers. The drainage water outlet gate 215 is located inside the valve body. The configuration is built to enhance the valve assembly.

Preferably, the control valve 21 chamber deploys two spacers. One spacer allocates the drainage water inlet passage while the other spacer allocates the drainage water outlet passage.

Preferably, a flow restrictor 4a is installed in between the drainage water inlet gate 4 and the tank. The other flow restrictor 111a is placed in the connection of the drainage water inlet and the first division.

The present invention also provides an operating method of reverse osmosis water purifying system applying a water storage tank deployed with a drainage water inlet, a drainage water outlet which is connected to the drain pipe, and a purified water inlet/outlet.

The present invention provides a technique for reverse osmosis water purifying system comprising a reverse osmosis membrane element defined a feed water inlet, a product water outlet and a waste water outlet which is linked by a tube to the water storage tank drainage inlet. A pre-filter is connected by an auto-shut-off valve high pressure inlet port and inlet of RO element. A post-filter is connected by a 3-way fitting to an auto-shut-off valve low pressure outlet port through the inlet port with RO membrane product water port. The other side of the post-filter connects a dispensing faucet. The 3-way fitting connects the purified water inlet of the tank.

The present invention provides a water storage technique comprising a soft bladder, a drainage water inlet, a drainage water outlet, purified water inlet/outlet regulated by a mechanical positioner valve.

The present invention aims to improve:
1. To hold purified water in a hygiene soft bladder using drainage water when dispensing require no air, no electrical power. The drainage water flushes the RO membrane to extend the service life of the reverse osmosis membrane.
2. To save space and easy maintenance by its compact design and large capacity of water storage.
3. Viable with low pressure, high pressure or in-between pressure reverse osmosis elements.
4. The safety concern of releasing overloaded pressure using a check valve to eliminate bladder expansion in case of a breakdown of control valve.

BRIEF DESCRIPTION OF THE DRAWINGS

FIG. 13 shows the steps of the operation of water tank unit of the present invention.

DETAILED DESCRIPTION OF THE PREFERRED EMBODIMENT

Figure 1:
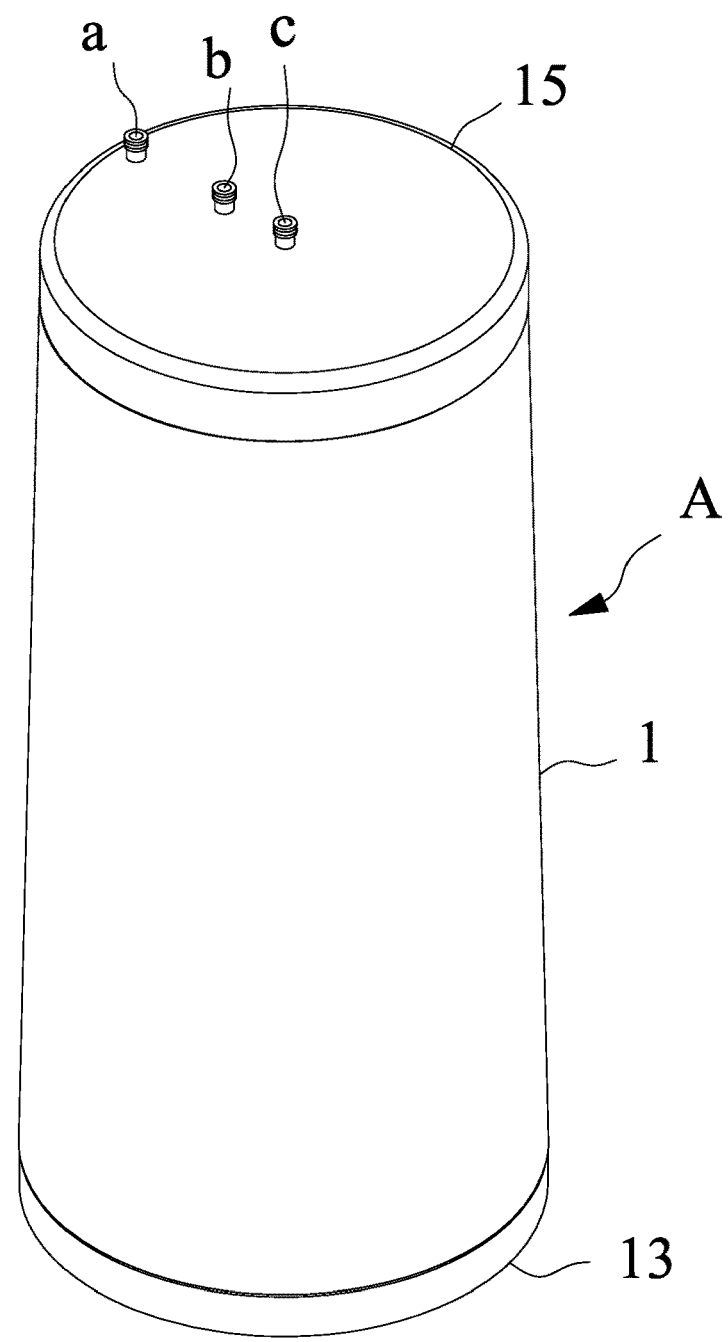
FIG. 1 is a perspective view to show the water tank unit of the present invention.

Referring to FIGS. 1 to 5, the present invention relates to a water tank unit "A" of a reverse osmosis water purifying system "B". The waste water of the reverse osmosis water purifying system "B" is converted to be the power to dispense the purified water from the water tank unit "A". The water tank unit "A" comprises a tank 1 having a chamber 11 defined therein, a soft bladder unit 3 is built in the chamber 11.

Multiple passages 111, 111a, 111b are defined through the top of the tank 1. The tank 1 has an open bottom 12 to which a bottom cover 13 is connected. A recess 10 is defined on top of the tank 1 so as to receive a control valve 2 therein. The control valve 2 is fixed by a fixing member 14. A top cover 15 is mounted on top of the tank 1. A notch 16 is defined under side of the recess 10, as shown in FIG. 5, the notch 16 is to give room to the drainage water passage to flow smoothly when the soft bladder unit 3 is full.

Figure 3:
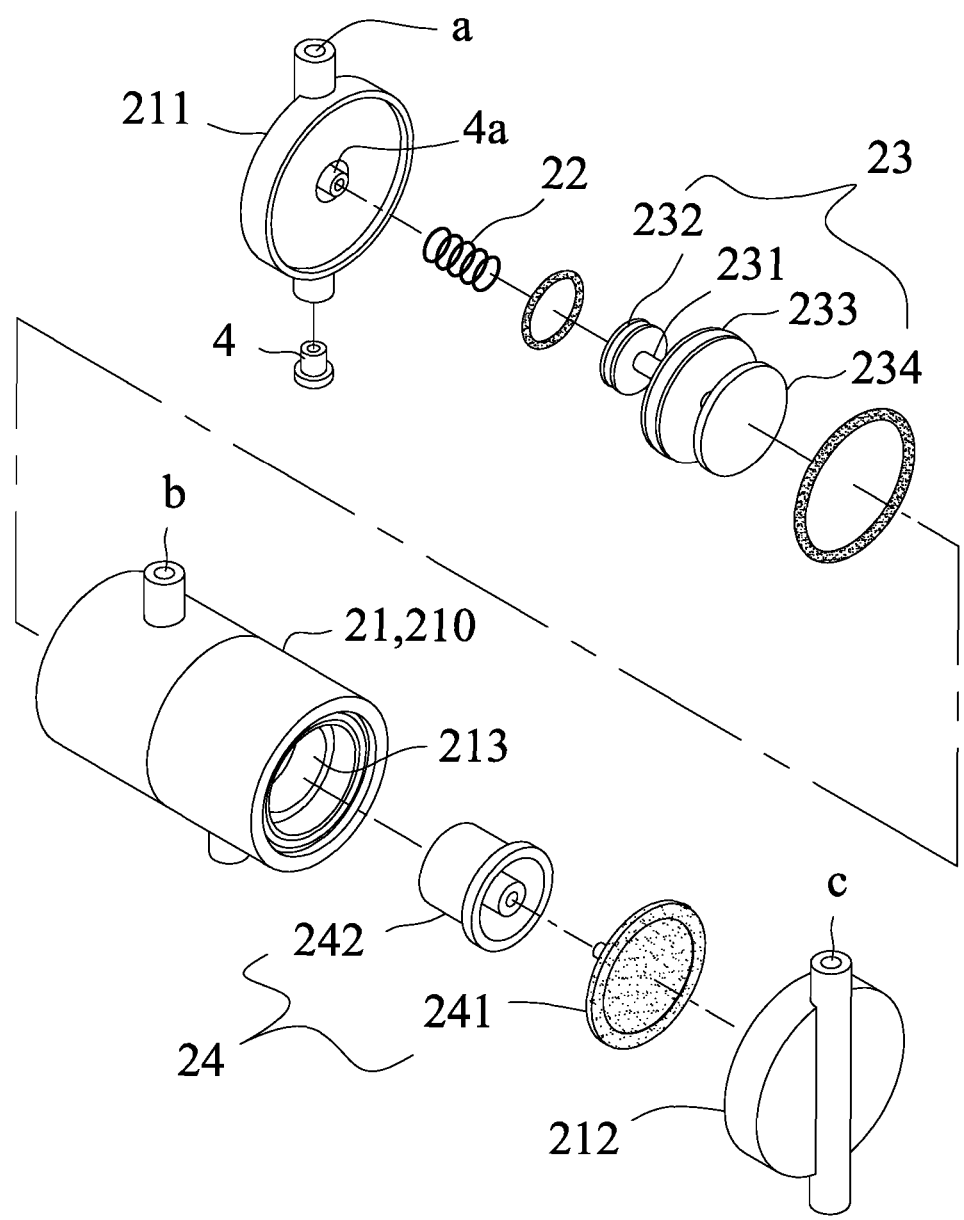
FIG. 3 is an exploded view of the control valve of the water tank unit of the present invention.
Figure 6:
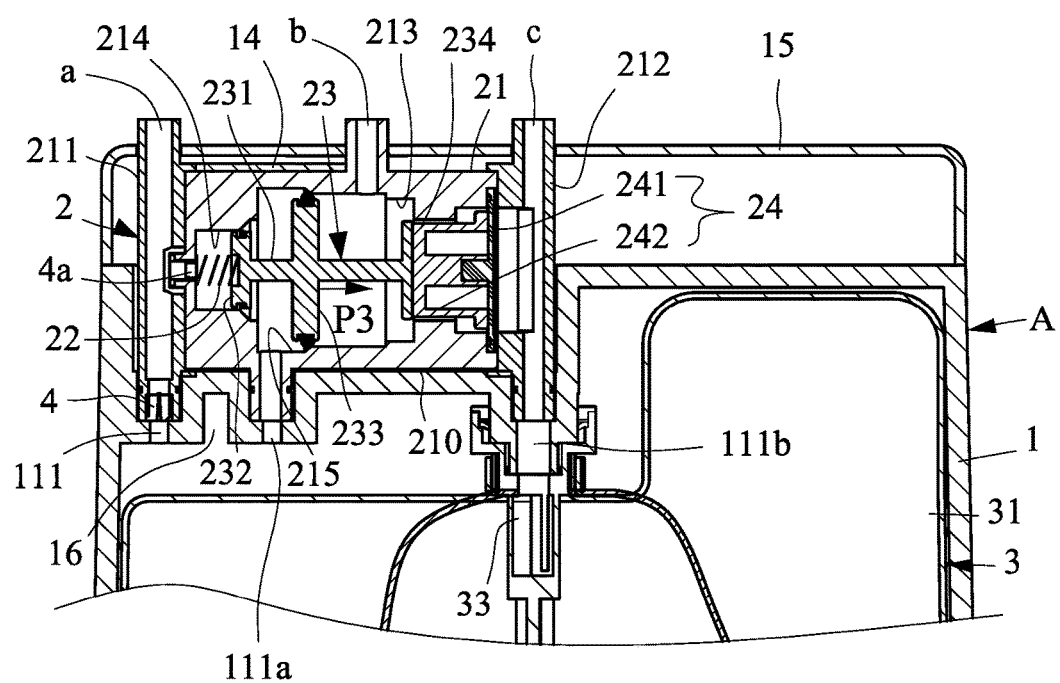
FIG. 6 is a cross sectional view of a portion of the water tank unit wherein no water is stored.

As shown in FIGS. 3 and 6, the control valve 2 has multiple water passages which include the drainage water inlet passage "a", the drainage water outlet path "b" and the purified water inlet/outlet passage "c". The 3 passages above are connected with gates 111, 111a, 111b on top of the tank 1 respectively. The control valve 2 further has a valve body 21, a spring member 22, a plunger core 23 and diaphragm unit 24. The spring member 22, the plunger core 23 and diaphragm unit 24 are installed in sequence in the division chamber 213 of the valve body 21. The spring member 22 provides a spring force P3 to push the plunger core 23. The control valve 21 has a body 210 and two side covers 211 and 212. The diaphragm unit 24 includes a film 241 and a seat 242 connected. The two side covers 211 and 212 are respectively connected to the both end of the valve body 210. The drainage water passage "a" and the purified water passage "c" respectively located on two side covers 211 and 212. The drainage water outlet passage "b" communicates with the interior of the body 210. The stepped hole 213 includes a first access 214 and a second access 215, wherein the first access 214 communicates with the drainage water inlet path "a", and the second access 215 communicates with the drainage water outlet path "b". The plunger core 23 has a first flow spacer 232, a second flow spacer 233 and a stopper seat 234. The valve plunger core 23 is located in the stepped hole 213, the first flow spacer 232 is located in the first access 214, and the second spacer 233 is located in the second path access. The plunger core 23 is located in the stepped hole 213, the first spacer 232 is located in the first access 214, and the second spacer 233 is located in the second access 215.

Figure 2:
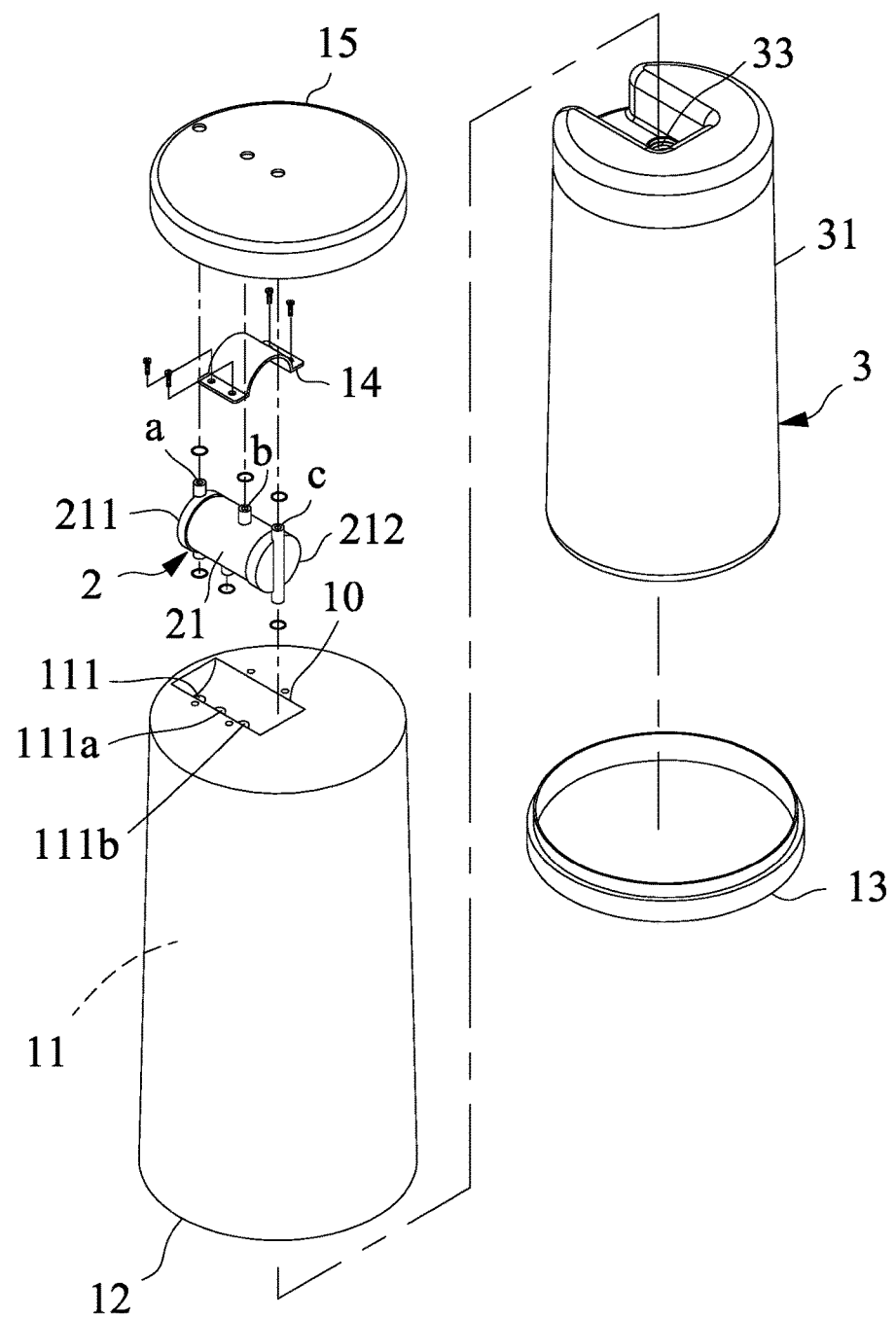
FIG. 2 is an exploded view of the water tank unit of the present invention.
Figure 5:
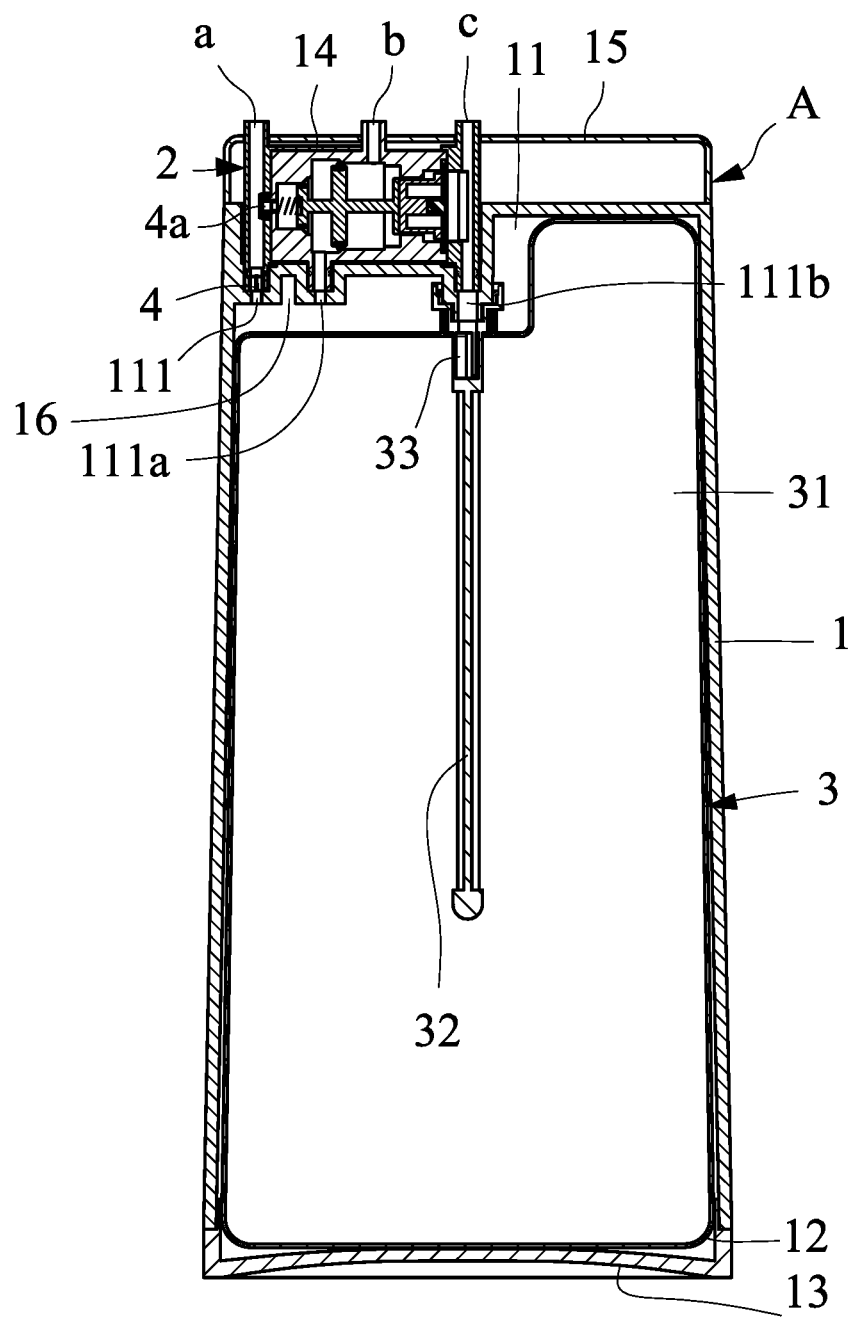
FIG. 5 is a cross sectional view of the water tank unit wherein no water is stored therein.

As shown in FIGS. 2 and 5, a soft bladder unit 3 is located in the room 11 of the tank 1 and has a bladder 31 with an axial support shaft 32 connected therein. The axial support shaft 32 has a connection path 33 connected to the top thereof. The connection path 33 is connected with the purified water path "c" so that the purified water is dispensed from the soft bladder unit 3 via the purified water path "c" and the connection path 33. The bladder 31 accumulates a pressure level established by the purified water. The drainage water temporarily stored in the tank 1, encompass the bladder 31 as shown in FIG. 7.

As shown in FIG. 6, a flow restrictor 4 is connected at the connection portion between the drainage water inlet path "a" and the room 11 of the tank 1, and another flow restrictor 4a is connected at a connection portion between the drainage water inlet path "a" and the first access 214. The flow restrictor 4, 4a restrict the drainage water from entering into the water tank unit "A" or the first access 214 by an excessive water pressure.

Figure 4:
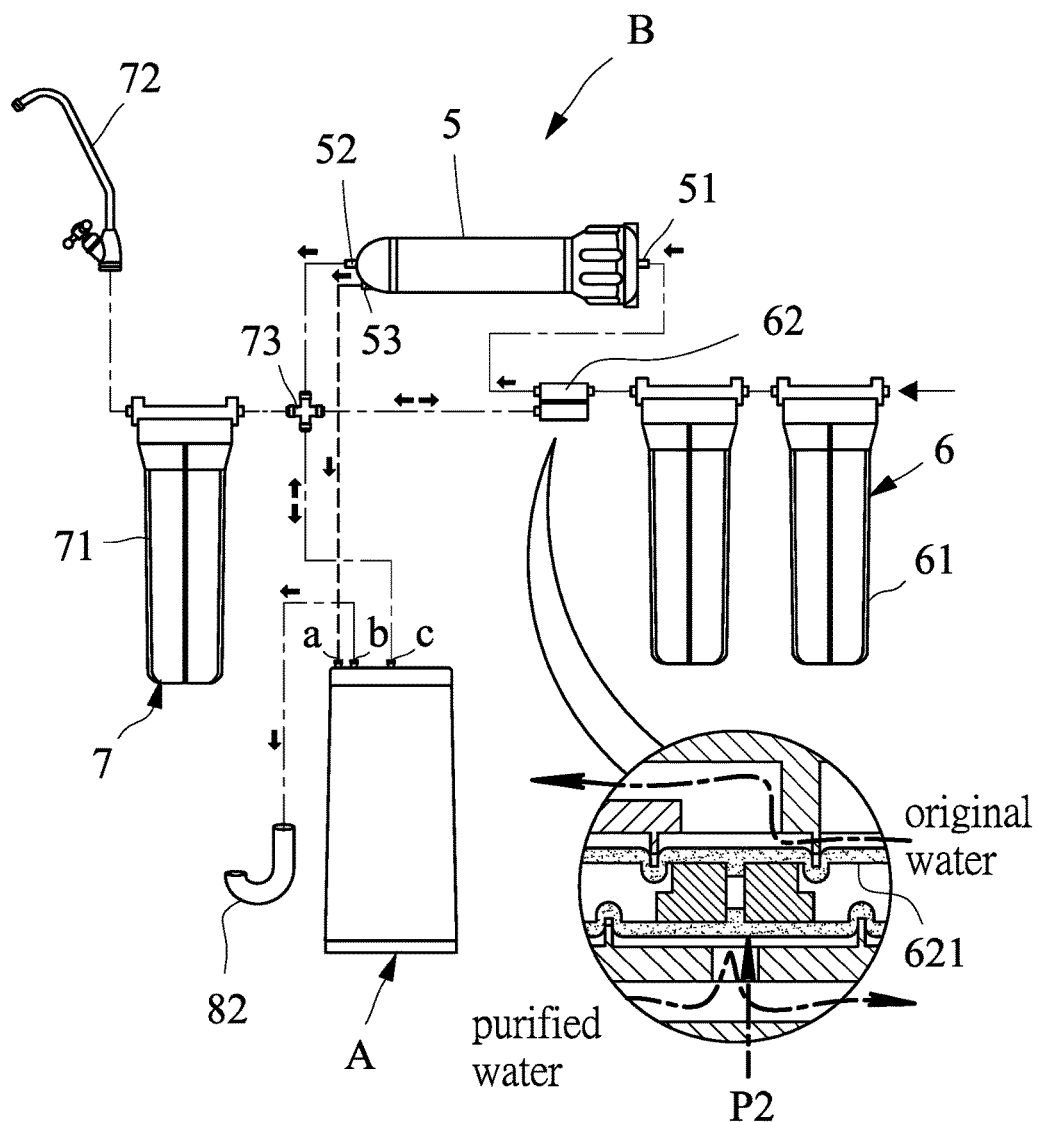
FIG. 4 shows the parts of the reverse osmosis water purifying system of the present invention.
Figure 7:
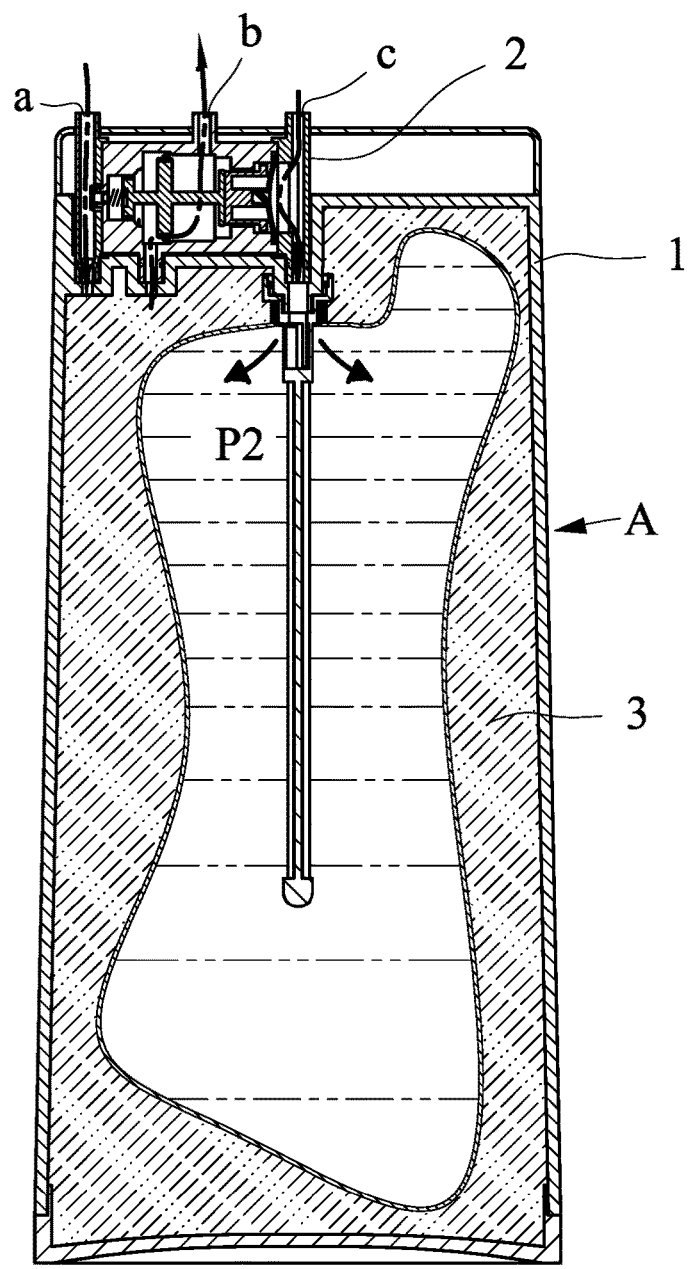
FIG. 7 is a cross sectional view of the water tank unit of the present invention wherein purified water is produced and stored in the soft bladder unit.

As shown in FIGS. 4 and 7, the water tank unit "A" is cooperated with a filter 5, a first filter 6, a filter unit 61, an auto-shut-off valve 62, a second filter 7, a 4-way connector 73, a drainage pipe 82 and other pipes to assemble the reverse osmosis water purifying system "B" of the present invention. The inlet 51 of the filter 5 connected to the first filter 6, the outlet 52 of the filter 5 is connected to the purified water path "c" of the water tank unit "A" and the second filter 7 by the 4-way connector 73. The drainage water outlet 53 of the filter 5 is connected to the drainage water inlet path "a" of the water tank unit "A".

The reverse osmosis water purifying system "B" of the present invention uses low pressure and medium pressure to be cooperated with the feed water source with pre-set pressure, so that no booster pump is required to boost the water from the feed water source. When the water from the feed water source flows to the filter 5, the present invention processes the water and generates purified water and drainage water. The purified water and the drainage water respectively flow through the holes 111b and 111 via the purified water path "c" and the drainage water inlet path "a" of the water tank unit "A". The purified water flows into the bladder 31 to form the purified water area via the connection path 33, and the drainage water encompass the bladder 31 inside the tank 1 to form the waste water area.

Figure 8:
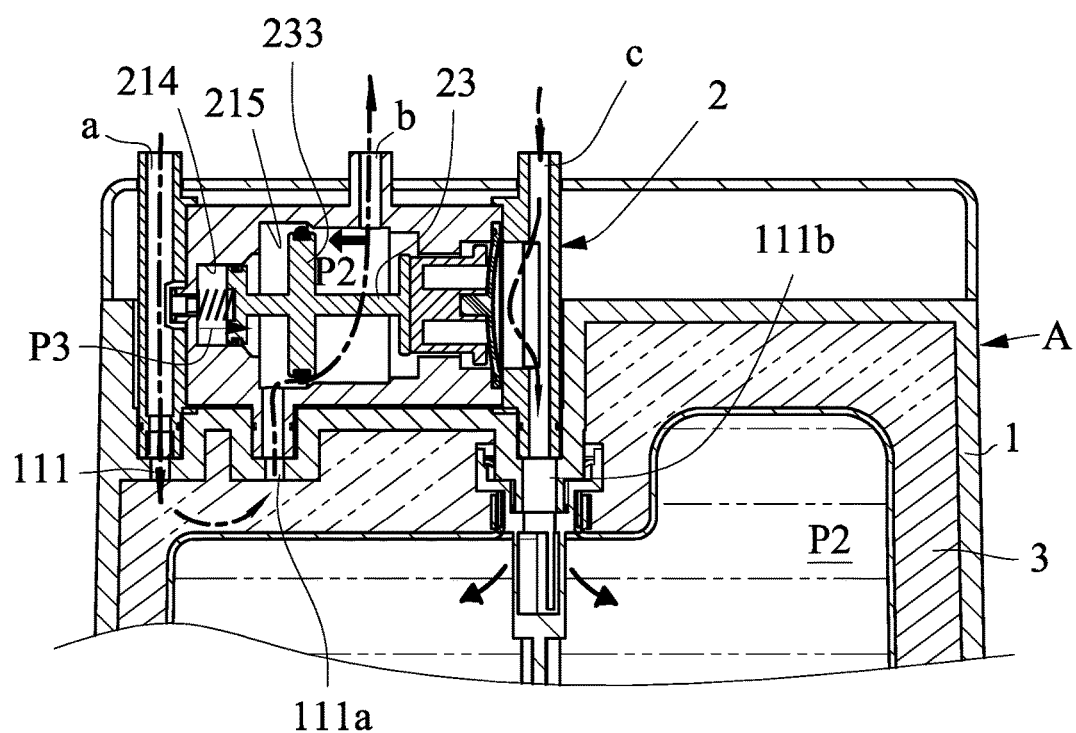
FIG. 8 shows that the drainage water is released from the water tank unit when purifying water.

As shown in FIG. 8, the purified water flows through the purified water path "c" and the pressure P2 in the purified water area push the second part 233 toward left to communicate the drainage water outlet path "b" and the hole 111a, so that the drainage water enters the second access 215 and the first access 214 via the hole 111a. The drainage water then flows to the drainage pipe 82 via the drainage water outlet path "b". If the pressure P2 is lower than the spring force P3, the plunger core 23 move toward right to shut off the communication between the drainage water outlet path "b" and the hole 111a as shown in FIG. 6.

Figure 9:
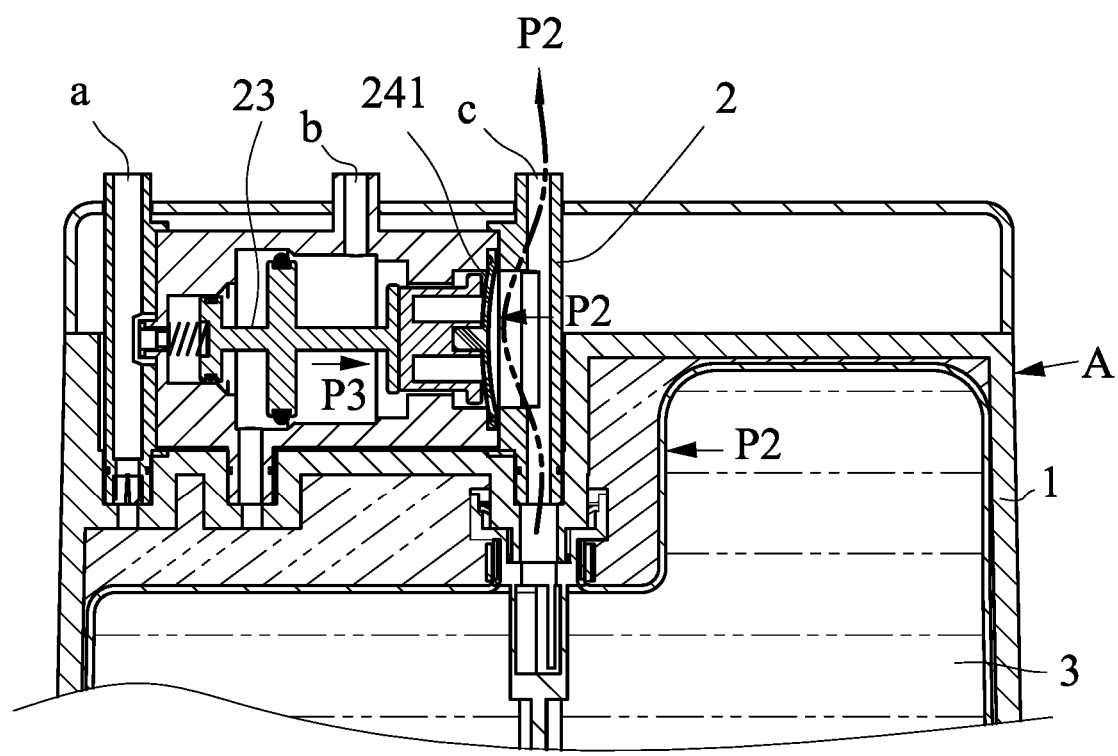
FIG. 9 shows that the water tank unit is fully filled with purified water.

As shown in FIGS. 4 and 9, when the bladder 31 is fully filled with purified water and has a pressure P2 to shut off the valve 62, as shown in FIG. 4 via the purified water path "c", a diaphragm piece 621 in the auto-shut-off valve 62 stops the feed water to filter 5. This stops both producing purified water and drainage water. The water tank unit "A" has small amount of drainage water therein.

As shown in FIGS. 4 and 9, when the dispensing faucet 72 is turned on, the purified water in the water tank unit "A" flows toward the second filter unit 71 and through to the faucet 72 by the force created by the amount of drainage water entering into the drainage water area in the water tank unit "A" and the accumulating force squeezes the bladder 31, wherein the bladder 31 has a pressure P2 stored therein, so that the purified water is squeezed out from the bladder 31 via the purified water path "c". The pressure P2 then drops and activates the reverse osmosis water purifying system "B" to produce purified water again. The drainage water flows into the water tank unit "A" via the holes 111, 111a and the drainage water inlet path "a". The pressure in the drainage water area is established by the entering of the drainage water so as to keep squeezing the soft bladder unit 3 to dispense the purified water until the faucet 72 is turned off. The water tank unit "A" then is under the status of producing purified water as shown in FIG. 8.

Figure 10:
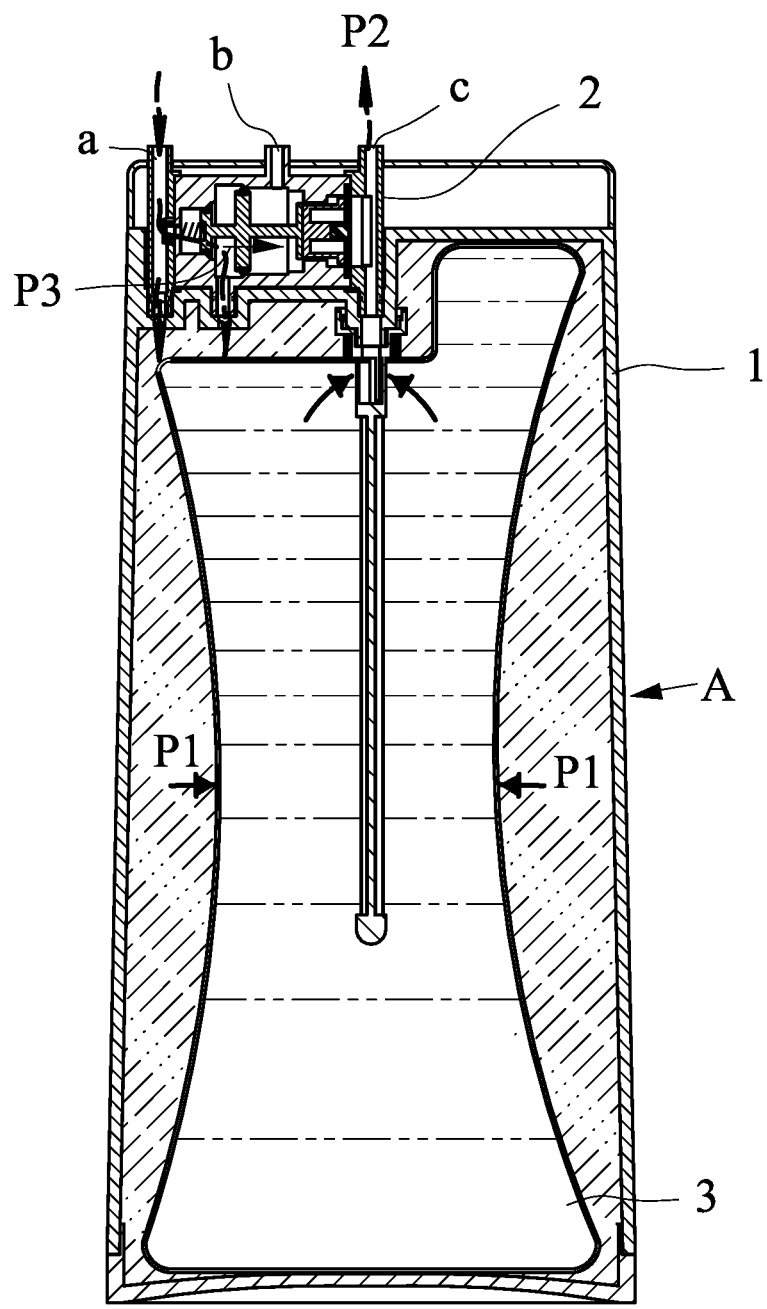
FIG. 10 shows that the purified water is squeezed out from the water tank unit.
Figure 10A:
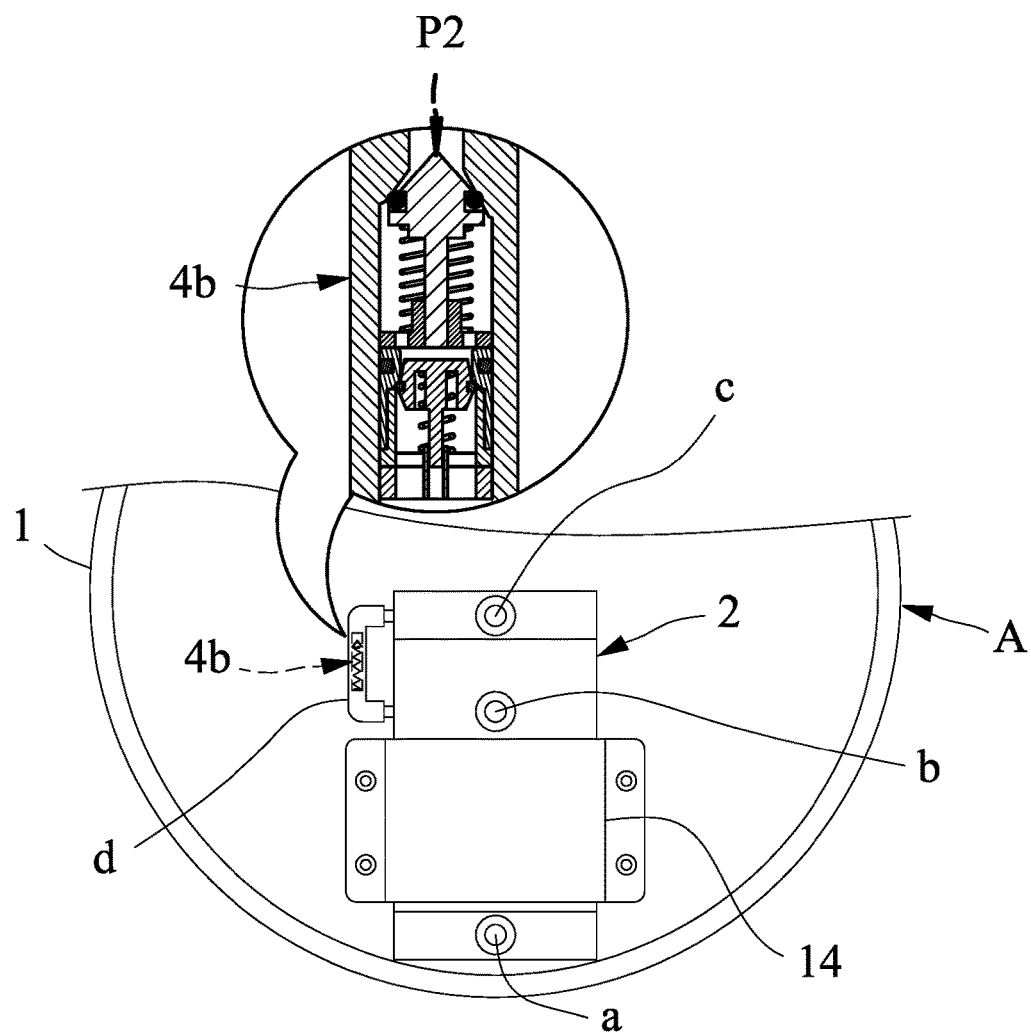
FIG. 10a is an enlarged section of FIG. 10.

As shown in FIG. 10a, in order to prevent the water tank unit "A" from exploding by high pressure due to problems of the auto-shut-off valves 62, 63, a check valve 4b is connected in the connection pipe "d" connected between the drainage water outlet path "b" and the purified water path "c". That means when the pressure in the water tank unit "A" is too high, the pressure P2 of the purified water is able to activate the check valve 4b, and a portion of the purified water is released via the drainage water outlet path "b" to prevent the water tank unit "A" from being damaged by high pressure.

Figure 11:
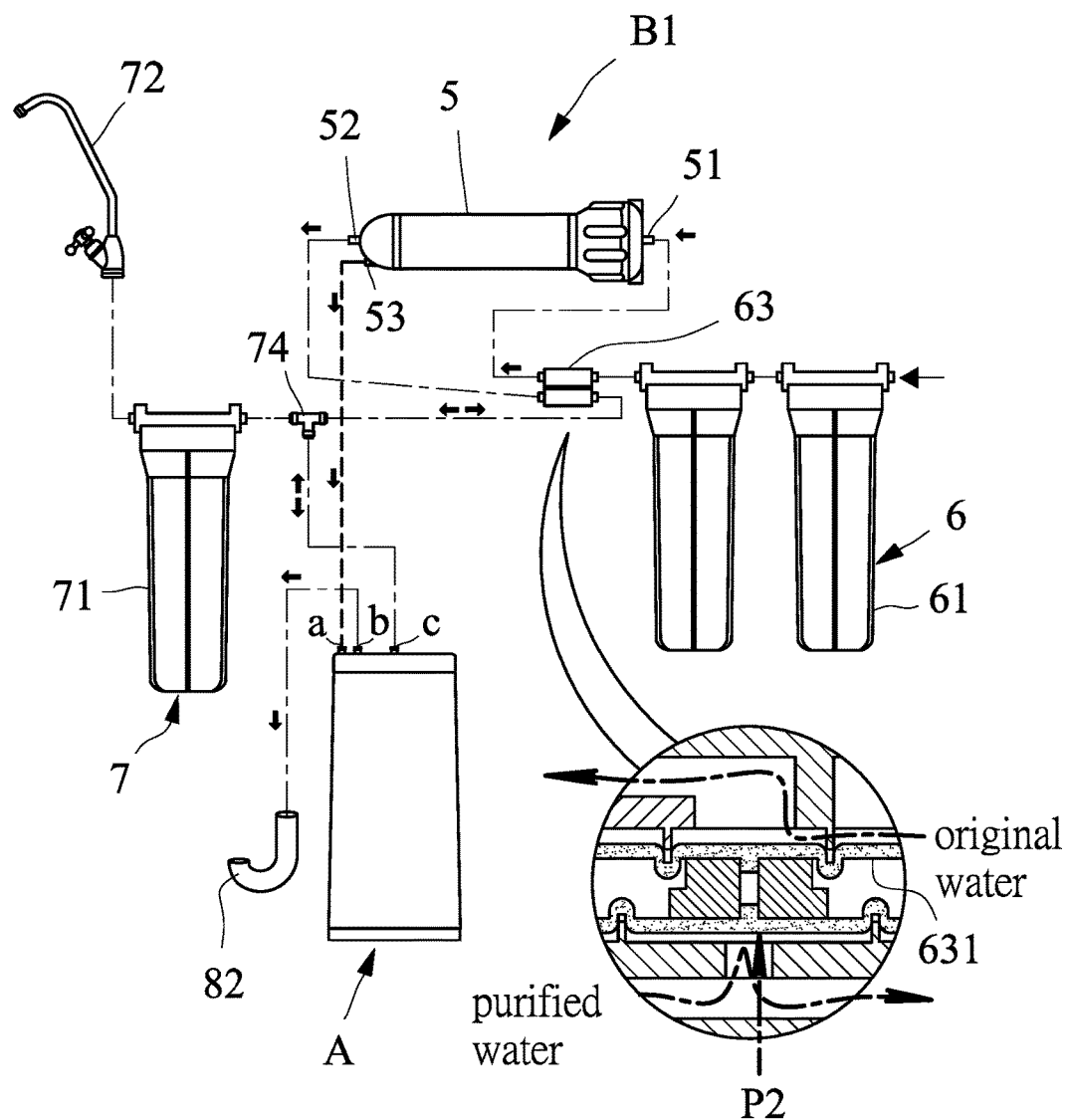
FIG. 11 shows another reverse osmosis water purifying system of the present invention.

As shown in FIG. 11 which shows a reverse osmosis water purifying system "B1" that is connected with the water tank unit "A", the difference between the reverse osmosis water purifying system "B" and the reverse osmosis water purifying system "B1" is that the auto-shut-off valve 63 and the 3-way connector 74 used in the reverse osmosis water purifying system "B1" are used for the feed water source with specific pressure without any booster pump. The reverse osmosis water purifying system "B1" is able to produce purified water.

Figure 12:
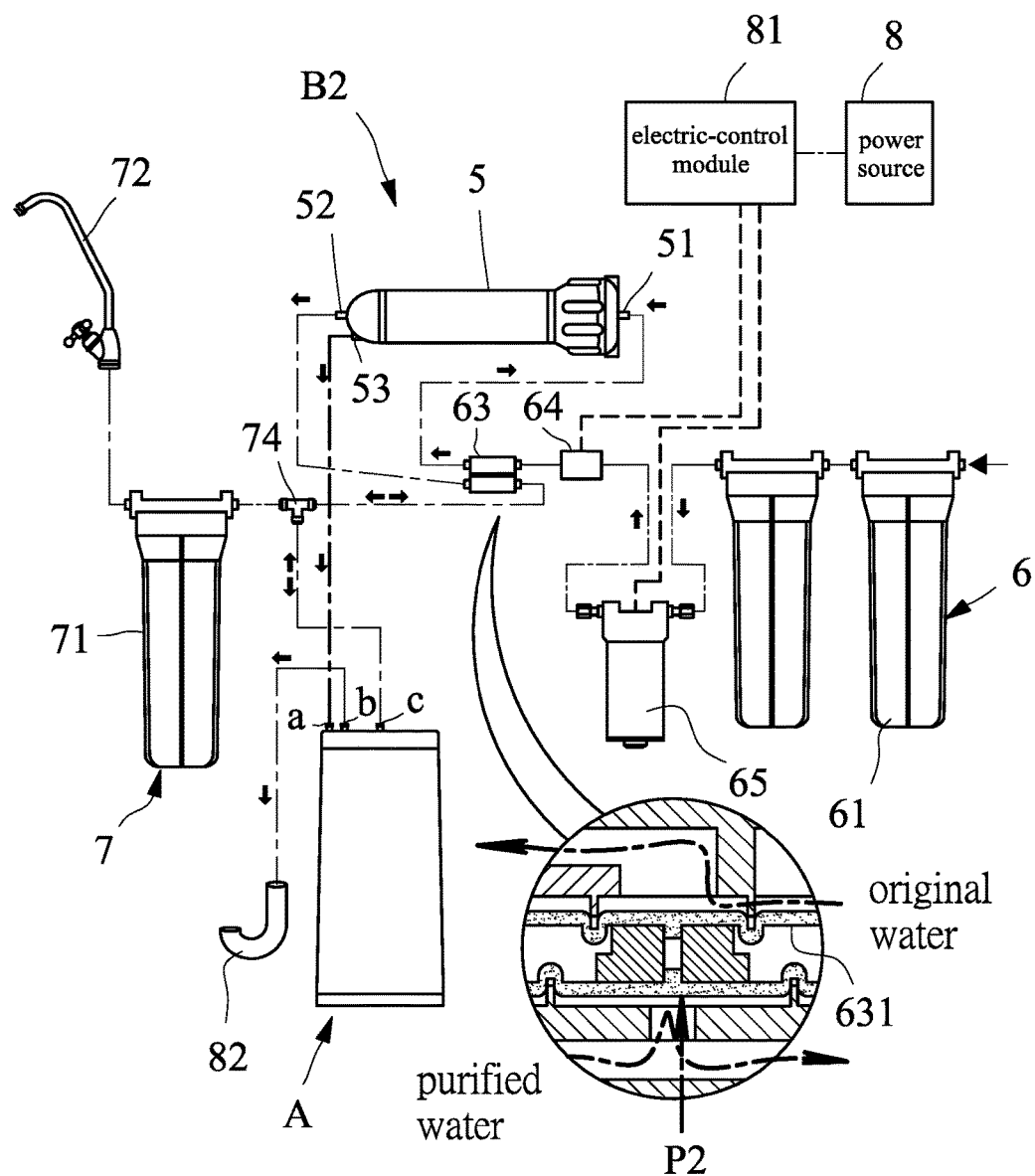
FIG. 12 shows yet another reverse osmosis water purifying system of the present invention.
Figure 14:
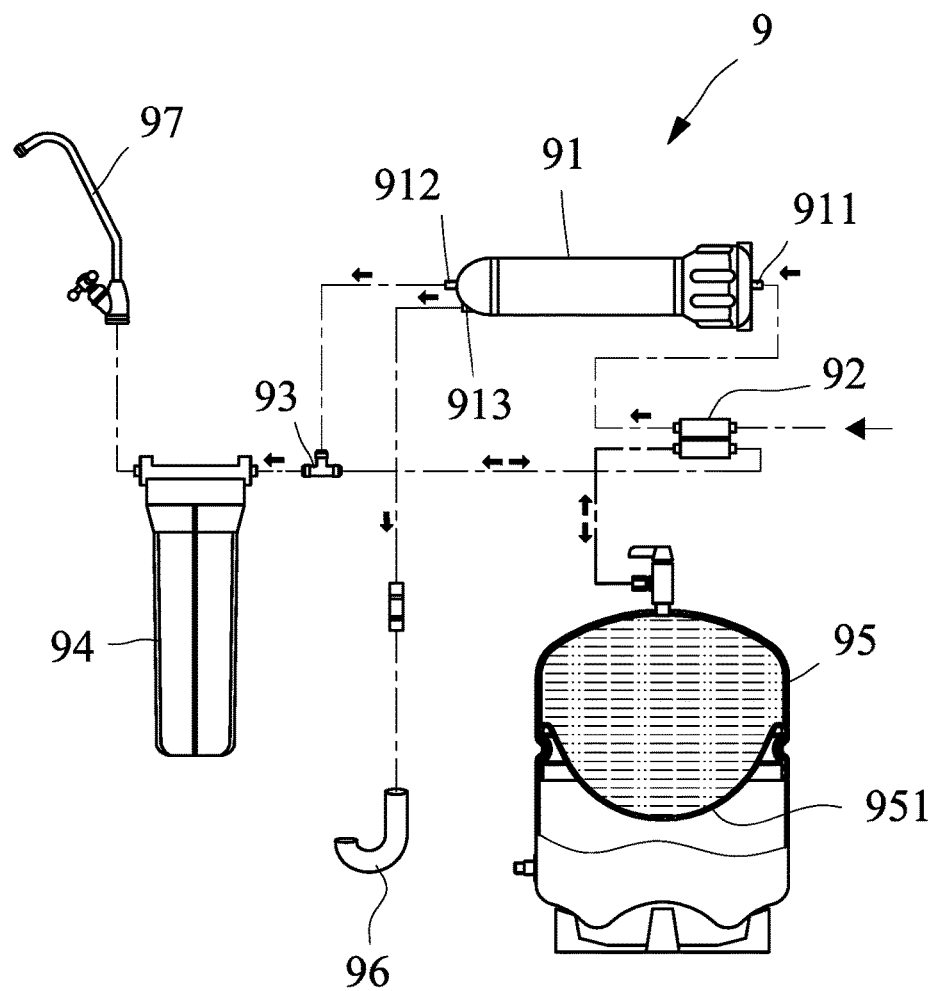
FIG. 14 shows a conventional reverse osmosis water purifying system.

As shown in FIG. 12 which shows a reverse osmosis water purifying system "B2" that is connected with the water tank unit "A", the difference between the reverse osmosis water purifying system "B2" and the reverse osmosis water purifying system "B1" is that the reverse osmosis water purifying system "B2" uses a pressure switch 64 or solenoid valve and a booster pump 65. The pressure switch 64 or solenoid valve and the booster pump 65 are electrically connected to the electric-control module 81 and the power source 8. The reverse osmosis water purifying system "B2" uses the booster pump 65 to deliver the water from the feed water source and generates a pre-set pressure. The water with the pre-set pressure pushes a diaphragm 631 in the auto-shut-off valve 63 and flows toward the filter 5 so as to produce purified water and drainage water. The purified water and the drainage water respectively flows into the water tank unit "A" via the purified water path "c" and the drainage water inlet path "a".

When the water tank unit "A" is fully filled with water, the pressure P2 of the purified water applies to the diaphragm 631 which blocks the path of the water pumped from the feed water source not to enter the filter 5, and a pressure of the water is accumulated. When the pressure switch 64 detects the pressure, the electric-control module 81 will shut off the electro-magnetic valve and the pump 65.

When the water tank unit "A" dispenses water, the pressure in the auto-shut-off valve 63 drops so that the water from the water source can turn the auto-shut-off valve 63 and flows toward the filter 5. When the pressure switch 64 detects the low pressure, the electric-control module 81 activates the pump 65 to allow the water from the water source to flow to the filter 5 via the auto-shut-off valve 63 to produce purified water and drainage water. The purified water and the drainage water are stored in the water tank unit "A". The circulation makes the reverse osmosis water purifying system "B2" to operate properly.

As shown in FIG. 13, the method for operating the water tank unit "A" comprising:

a step (a) of installing a drainage water and purified water paths: preparing a water tank unit "A" which has a tank 1, a drainage water inlet path "a", a drainage water outlet path "b" and purified water path "c" being defined in the tank 1;

a step (b) of installing a soft bladder unit 3: installing a soft bladder unit 3 in the tank 1 for storage of purified water therein, and a step (c) of installing a control valve: installing a control valve 2 between the drainage water inlet path "a" and the drainage water outlet path "b", the control valve 2 communicating with the purified water path "c" and controlling the drainage water and the purified water to be introduced into and drawn out from the water tank unit "A".

While we have shown and described the embodiments in accordance with the present invention, it should be clear to those skills in the art that further embodiments may be made without departing from the scope of the present invention.

What is claimed is:

1. A water tank unit (A) comprising:
  a tank (1) having a room (11) defined therein, multiple holes (111, 111a, 111b) defined through a top of the tank (1), the tank (1) having an open bottom (12) to which a bottom cover (13) is connected;

a control valve (2) mounted atop the tank (1) and having multiple water passages, the water passages including a drainage water inlet passage (a), a drainage water outlet passage (b) and a purified water passage (c) and connected with the holes (111, 111a, 111b) in the top of the tank (1) respectively, and a soft bladder unit (3) located in the room (11) of the tank (1) and having a bladder (31) with an axial support shaft (32) connected therein, the axial support shaft (32) having a connection path (33) connected to a top thereof, the connection path (33) connected with the purified water passage (c), the control valve (2) controls drainage water to enter into and to flow out from the room (11) of the tank (1), and when the drainage water enters into the room (11), the drainage water squeezes purified water in the soft bladder unit (3) out from the tank (1).

2. The water tank unit as claimed in claim 1, wherein a pressure P2 is formed in the soft bladder unit (3) as the bladder is filled and no drainage water is received in the room (11) of the tank (1).

3. The water tank unit as claimed in claim 2, wherein a check valve (4b) is connected in a connection pipe (d) connected between the drainage water outlet passage (b) and the purified water passage (c).

4. The water tank unit as claimed in claim 3, wherein the control valve (2) has a valve body (21), a spring member (22), a plunger core (23) and a diaphragm unit (24), the spring member (22), the plunger core (23) and the diaphragm unit (24) are installed in a stepped hole (213) in the valve body (21) in sequence, the spring member (22) provides a spring force P3 to move the plunger core (23), when the water tank unit (A) generates purified water, the pressure P2 is larger than the spring force P3 so that the control valve (2) allows a flow of the drainage water out.

5. The water tank unit as claimed in claim 4, wherein the valve body (21) has a body (210) and two side covers (211, 212), the diaphragm unit (24) includes a film (241) and a stopper seat (242) to which the film (241) is connected, the two side covers (211, 212) are respectively connected to two ends of the body (210), the drainage water inlet passage (a) and the purified water passages(c) respectively extend through the two side covers (211, 212), the drainage water outlet passage (b) communicates within the interior of the body (210).

6. The water tank unit as claimed in claim 5, wherein the stepped hole (213) includes a first access (214) and a second access (215), the first access (214) communicates with the drainage water inlet passage (a), the second access (215) communicates with the drainage water outlet passage (b), the plunger core (23) has a first flow spacer (232), a second flow spacer (233) and a stopper seat (234), the plunger core (23) is located in the stepped hole (213), the first flow spacer (232) is located in the first access (214), the second flow spacer (233) is located in the second access (215), the plunger core (23) is pushed by the drainage water so that the drainage water enters into the room (11) of the tank (1) to squeeze the purified water in the soft bladder unit (3) out.

7. The water tank unit as claimed in claim 6, wherein a flow restrictor (4) is connected at a connection portion between the drainage water inlet passage (a) and the room (11) of the tank (1), another flow restrictor (4a) is connected at a connection portion between the drainage water inlet passage (a) and the first access (214).

* * * * *